(12) United States Patent
Voorheis et al.

(10) Patent No.: US 9,120,887 B2
(45) Date of Patent: Sep. 1, 2015

(54) CROSSLINKED COMPOSITIONS AND ARTICLES PREPARED THEREFROM

(75) Inventors: Peter R. Voorheis, Missouri City, TX (US); Brian W. Walther, Clute, TX (US); Selim Yalvac, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/695,104

(22) PCT Filed: Jun. 21, 2011

(86) PCT No.: PCT/US2011/041175
§ 371 (c)(1),
(2), (4) Date: Oct. 29, 2012

(87) PCT Pub. No.: WO2011/163176
PCT Pub. Date: Dec. 29, 2011

(65) Prior Publication Data
US 2013/0096263 A1 Apr. 18, 2013

Related U.S. Application Data

(60) Provisional application No. 61/357,377, filed on Jun. 22, 2010.

(51) Int. Cl.
*C08J 3/24* (2006.01)
*C08L 23/08* (2006.01)
*C08F 236/04* (2006.01)
*C08L 23/16* (2006.01)

(52) U.S. Cl.
CPC ............... *C08F 236/04* (2013.01); *C08J 3/24* (2013.01); *C08J 3/246* (2013.01); *C08L 23/083* (2013.01); *C08L 23/0823* (2013.01); *C08L 23/16* (2013.01); *C08L 23/0815* (2013.01)

(58) Field of Classification Search
CPC . C08L 23/16; C08L 23/0815; C08L 23/0823; C08L 23/083; C08J 3/24; C08J 3/246
USPC ............ 525/240, 331.7, 331.9, 332.1, 332.5, 525/332.6, 387, 332.8, 333.7
See application file for complete search history.

(56) References Cited

U.S. PATENT DOCUMENTS

| | | | |
|---|---|---|---|
| 4,128,523 A * | 12/1978 | Britton et al. | 524/525 |
| 5,096,867 A * | 3/1992 | Canich | 502/103 |
| 5,272,236 A | 12/1993 | Lai et al. | |
| 5,278,272 A | 1/1994 | Lai et al. | |
| 6,225,412 B1 * | 5/2001 | Chaffin et al. | 525/240 |
| 6,331,597 B1 | 12/2001 | Drumright et al. | |
| 6,583,222 B1 | 6/2003 | Chaudhary et al. | |
| 6,680,361 B1 | 1/2004 | Cady et al. | |
| 7,199,180 B1 | 4/2007 | Simmons et al. | |
| 7,322,523 B2 | 1/2008 | Howarth et al. | |
| 7,335,696 B2 | 2/2008 | Yalvac et al. | |
| 7,531,601 B2 | 5/2009 | Karjala et al. | |
| 7,619,026 B2 | 11/2009 | Yang et al. | |
| 7,619,027 B2 | 11/2009 | Lundmark et al. | |
| 7,622,523 B2 | 11/2009 | Li et al. | |
| 7,652,083 B2 | 1/2010 | Mullen | |
| 7,741,408 B2 | 6/2010 | Walther et al. | |
| 7,781,510 B2 | 8/2010 | Yalvac et al. | |
| 7,795,365 B2 | 9/2010 | Karjala et al. | |
| 2002/0183441 A1 | 12/2002 | Morikawa et al. | |
| 2006/0030667 A1 * | 2/2006 | Yalvac et al. | 525/191 |
| 2006/0100335 A1 * | 5/2006 | Yalvac et al. | 524/425 |
| 2006/0227919 A1 | 10/2006 | Wolaver | |
| 2008/0227919 A9 | 9/2008 | Li et al. | |
| 2009/0043049 A1 | 2/2009 | Chapman et al. | |

FOREIGN PATENT DOCUMENTS

| | | |
|---|---|---|
| EP | 735091 A2 * | 10/1996 |
| JP | H08-269259 A | 10/1996 |
| JP | 2009-235192 | 10/2009 |

OTHER PUBLICATIONS

PCT/US/2011/041175 International Search Report and Written Opinion of the International Searching Authority, Aug. 2011.
PCT/US/2011/041175, International Preliminary Report on Patentability, Dec. 2012.

* cited by examiner

*Primary Examiner* — Roberto Rabago

(57) ABSTRACT

The invention provides a crosslinked composition formed by thermally treating a composition comprising at least the following: A) an ethylene-based polymer that has a density less than, or equal to, 0.910 g/cc; B) an olefin-based polymer that has a melt viscosity less than, or equal to, 20,000 cP, at 350° F.; and C) a crosslinking agent.

17 Claims, No Drawings

CROSSLINKED COMPOSITIONS AND ARTICLES PREPARED THEREFROM

This application is a non-provisional application claiming priority from the U.S. Provisional Patent Application No. 61/357,377, filed on Jun. 22, 2010, entitled "CROSSLINKED COMPOSITIONS AND ARTICLES PREPARED THEREFROM," the teachings of which are fully incorporated by reference herein.

BACKGROUND OF THE INVENTION

Plasticizers are typically required in elastomeric formulations for improved processability, and reduced brittleness in the final manufactured article. However, such plasticizers generally reduce the mechanical properties, and, due to migration, reduce the aging resistance, of cured elastomeric formulations. There is a need for new crosslinked elastomeric formulations containing low volatility polymers, instead of conventional plasticizers, and which have maintained processibility. These crosslinked formulations should also have excellent mechanical and aging properties.

U.S. Publication No. 2006/0030667 discloses a thermoplastic composition comprising (i) from 1 to 99 percent by weight of at least one thermoplastic copolymer, for example, a styrene block copolymer, and (ii) from 1 to 99 percent by weight of at least one homogeneously branched ethylene/α-olefin interpolymer, for example an ethylene/1-octene copolymer, having a density of less than, or equal to, 0.899 g/cc, and a Brookfield viscosity of greater than 500 cP (350° F.).

U.S. Publication No. 2009/0043049 discloses a polyolefin composition that contains 60 to 99 weight percent of one or more polyolefin polymers, and 1 to 40 weight percent of a regularly branched PAO (poly(alpha-olefin)), based on the total weight of the polyolefin polymer(s) and the regularly branched PAO. The PAO includes oligomers of one or more C2 to C20 alpha-olefins having a kinematic viscosity, at 100° C., of 3 to 3000 cSt, a Branching Irregularity Index (BII) of 0.40 or less, a molar-average carbon number of 6 to 14, and a Mw/Mn of less than 2.3.

U.S. Pat. No. 7,335,696 discloses highly filled polymer compositions comprising a low molecular weight ethylene and/or alpha olefin homopolymers and copolymers, or blends therefrom, filled with high concentrations of fillers or additives. See also U.S. Pat. No. 7,781,510.

Additional compositions are described in the following references: U.S. Pat. Nos. 7,531,601, 7,622,523, 7,619,026; U.S. Publication Nos. 2009/0043049, 2008/0227919; International Publication Nos. WO 2004/031250, WO 2004/087804, WO 2001/40374, and WO 1997/33921.

There remains a need for new elastomeric compositions, containing low volatility polymers that maintain the processibility of the compositions, and which, when cured, have excellent mechanical properties and excellent properties after aging. These needs and others have been met by the following invention.

SUMMARY OF THE INVENTION

The invention provides a crosslinked composition formed by thermally treating a composition comprising at least the following:
A) an ethylene-based polymer that has a density less than, or equal to, 0.910 g/cc;
B) an olefin-based polymer that has a melt viscosity less than, or equal to, 20,000 cP, at 350° F.; and
C) a crosslinking agent.

DETAILED DESCRIPTION OF THE INVENTION

As discussed above, the invention provides a crosslinked composition formed by thermally treating a composition comprising at least the following:
A) an ethylene-based polymer that has a density less than, or equal to, 0.910 g/cc, preferably less than, or equal to, 0.900 g/cc, and more preferably less than, or equal to, 0.890 g/cc;
B) an olefin-based polymer that has a melt viscosity less than, or equal to, 20,000 cP, preferably less than, or equal to, 16,000 cP, more preferably less than, or equal to, 10,000 cP, at 350° F.; and
C) a crosslinking agent.

In one embodiment, Component A is present in an amount from 50 to 98 weight percent, and Component B is present in an amount from 2 to 50 weight percent, and wherein the weight percentages of Components A and B are each based on the sum weight of Components A and B.

In one embodiment, the ethylene-based polymer of Component A is an ethylene/α-olefin/diene interpolymer.

In one embodiment, the composition has an ultimate tensile strength greater than 12 MPa, an ultimate elongation greater than 100 percent, and a Shore A Hardness greater than 60, preferably greater than 65.

In one embodiment, the olefin-based polymer of Component B has a melting temperature (Tm) greater than 40° C., preferably greater than 50° C., and more preferably greater than 60° C., as determined by DSC. In a further embodiment, the olefin-based polymer is an ethylene-based polymer. In a further embodiment, the ethylene-based polymer is an ethylene/α-olefin interpolymer, and preferably an ethylene/α-olefin copolymer. In another embodiment, the ethylene-based polymer is an ethylene/α-olefin multi-block interpolymer, and preferably an ethylene/α-olefin multi-block copolymer.

In one embodiment, the olefin-based polymer of Component B has a melting temperature (Tm) less than 100° C., preferably less than 90° C., and more preferably less than 80° C., as determined by DSC. In a further embodiment, the olefin-based polymer is an ethylene-based polymer. In a further embodiment, the ethylene-based polymer is an ethylene/α-olefin interpolymer, and preferably an ethylene/α-olefin copolymer. In another embodiment, the ethylene-based polymer is an ethylene/α-olefin multi-block interpolymer, and preferably an ethylene/α-olefin multi-block copolymer.

In one embodiment, Component B is present in an amount from 2 to 40 weight percent, preferably from 5 to 35 weight percent, based on the sum weight of Components A and B.

In one embodiment, the olefin-based polymer of Component B has a molecular weight distribution (Mw/Mn) from 1.2 to 3.5, preferably from 1.5 to 2.5, and more preferably from 1.7 to 2.3. In a further embodiment, the olefin-based polymer is an ethylene-based polymer. In a further embodiment, the ethylene-based polymer is an ethylene/α-olefin interpolymer, and preferably an ethylene/α-olefin copolymer. In another embodiment, the ethylene-based polymer is an ethylene/α-olefin multi-block interpolymer, and preferably an ethylene/α-olefin multi-block copolymer.

In one embodiment, the olefin-based polymer of Component B is an ethylene-based polymer. In a further embodiment, the ethylene-based polymer is a homogeneously branched linear ethylene/α-olefin interpolymer, and preferably a copolymer, or a homogeneously branched substantially linear ethylene/α-olefin interpolymer, and preferably a copolymer.

In one embodiment, the olefin-based polymer of Component B is an ethylene-based polymer. In a further embodiment, the ethylene-based polymer is a homogeneously branched substantially linear ethylene/α-olefin interpolymer, and preferably a copolymer.

In one embodiment, the olefin-based polymer of Component B is an ethylene-based polymer. In a further embodiment, the ethylene-based polymer is a homogeneously branched linear ethylene/α-olefin interpolymer, and preferably a copolymer.

In one embodiment, the olefin-based polymer of Component B is an ethylene-based polymer. In a further embodiment, the ethylene-based polymer is an ethylene/α-olefin multi-block interpolymer, and preferably an ethylene/α-olefin multi-block copolymer.

In one embodiment, the ethylene-based polymer of Component A has a Mooney Viscosity (ML 1+4) at 125° C., from 10 to 200, preferably from 30 to 150, and more preferably from 50 to 100.

In one embodiment, the ethylene-based polymer of Component A is present in an amount from 60 to 98 weight percent, more preferably from 65 to 95 weight percent, based on the sum weight of Components A and B.

In one embodiment, the composition has a maximum torque (MH) greater than three times, preferably greater than four times, and more preferably greater than five times, the minimum torque (ML), each as determined by MDR at 160° C.

In one embodiment, the composition has a maximum torque (MH) greater than three times, preferably greater than four times, and more preferably greater than five times, the minimum torque (ML), each as determined by MDR at 175° C.

In one embodiment, the composition does not contain a tackifier. Examples of tackifiers include rosin derivatives, such as wood rosin, tall oil, gum rosin; rosin esters, natural and synthetic terpenes, and derivatives of such; and aliphatic, aromatic or mixed aliphatic-aromatic petroleum based tackifiers. Representative examples of hydrocarbon resins include alpha-methyl styrene resins, branched and unbranched C5 resins, C9 resins, C10 resins, as well as styrenic and hydrogenated modifications of such.

In one embodiment, the composition does not contain a propylene-based polymer.

An inventive composition may comprise a combination of two or more embodiments as described herein.

The ethylene-based polymer of Component A may comprise a combination of two or more embodiments as described herein.

The olefin-based polymer of Component B may comprise a combination of two or more embodiments as described herein.

The invention also provides an article comprising at least one component comprising an inventive crosslinked composition.

The invention also provides for an article comprising at least one component formed from an inventive composition.

An inventive article may comprise a combination of two or more embodiments as described herein.

It has been discovered that the inventive compositions have improved aging properties. It has also been discovered that the inventive compositions have a complex viscosity, at high shear rate, which is essentially the same for a similar composition plasticized using conventional materials. The inventive compositions can be used in a wide range of applications, such as applications where the finished part is exposed to continual high heat; applications where the migration of an oil or a liquid plasticizer is not acceptable in the end use performance requirements, such as in medical tubing; and applications where the volatility of the plasticizer will negatively impact the end use article, such as in automotive dashboards, multi-paned window seals, and sealed chambers.

Ethylene-Based Polymer (Component A)

Ethylene-based polymers include, but are not limited to, ethylene/α-olefin/diene interpolymers and ethylene/α-olefin interpolymers.

Ethylene/α-Olefin/Diene Interpolymers (Component A)

The ethylene/α-olefin/diene interpolymers have polymerized therein C2 (ethylene), at least one α-olefin and a diene. Suitable examples of α-olefins include the C3-C20 α-olefins. Suitable examples of suitable dienes include the C4-C40 non-conjugated dienes.

The α-olefin is preferably a C3-C20 α-olefin, preferably a C3-C16 α-olefin, and more preferably a C3-C10 α-olefin. Preferred C3-C10 α-olefins are selected from the group consisting of propylene, 1-butene, 1-hexene and 1-octene, and more preferably propylene. In a preferred embodiment, the interpolymer is an EPDM interpolymer. In a further embodiment, the diene is 5-ethylidene-2-norbornene (ENB).

In one embodiment, the diene is a C6-C15 straight chain, branched chain or cyclic hydrocarbon diene. Illustrative non-conjugated dienes are straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. The diene is preferably a non-conjugated diene selected from ENB, dicyclopentadiene, 1,4-hexadiene, or 7-methyl-1,6-octadiene, and preferably, ENB, dicyclopentadiene or 1,4-hexadiene, more preferably ENB or dicyclopentadiene, and even more preferably ENB.

Some examples of ethylene/α-olefin/diene interpolymers include the NORDEL IP Hydrocarbon Rubbers from The Dow Chemical Company.

In a preferred embodiment, the ethylene/α-olefin/diene interpolymer comprises a majority amount of polymerized ethylene, based on the weight of the interpolymer.

In one embodiment of the invention, the ethylene/α-olefin/diene interpolymer has a molecular weight distribution ($Mw_{(Conv)}/Mn_{(Conv)}$) from 2 to 3, preferably from 2.05 to 2.8 and more preferably from 2.05 to 2.5, and even more preferably from 2.05 to 2.25. In a further embodiment, the interpolymer is an EPDM terpolymer. In a further embodiment, the diene is ENB.

In one embodiment, the ethylene/α-olefin/diene interpolymer has a Mooney viscosity, ML(1+4) at 125° C., greater than 10, preferably greater than 30, more preferably greater than 50. In a further embodiment, the interpolymer is an EPDM terpolymer. In a further embodiment, the diene is ENB.

In one embodiment, the ethylene/α-olefin/diene interpolymer has a Mooney viscosity, ML(1+4) at 125° C., less than 200, preferably less than, or equal to, 150, more preferably less than, or equal to, 100. In a further embodiment, the interpolymer is an EPDM terpolymer. In a further embodiment, the diene is ENB.

Mooney viscosity is that of the neat interpolymer (or calculated viscosity of neat polymer for polymers that contain a filler, such as carbon black, and/or an oil). The neat polymer refers to the polymer without filler and without oil.

In one embodiment, the ethylene/α-olefin/diene interpolymer has a density greater than, or equal to, 0.855 g/cc, preferably greater than, or equal to, 0.860 g/cc, more preferably greater than, or equal to, 0.865 g/cc. In a further embodiment, the interpolymer is an EPDM terpolymer. In a further embodiment, the diene is ENB.

In one embodiment, the ethylene/α-olefin interpolymer/diene has a density less than, or equal to, 0.910 g/cc, preferably less than, or equal to, 0.900 g/cc, more preferably less than, or equal to, 0.890 g/cc. In a further embodiment, the interpolymer is an EPDM terpolymer. In a further embodiment, the diene is ENB.

In one embodiment, the ethylene/α-olefin/diene interpolymer has a $Mn_{(conv)}$ from 50,000 to 300,000 g/mole, preferably from 80,000 to 250,000 g/mole. In a further embodiment, the interpolymer is an EPDM terpolymer. In a further embodiment, the diene is ENB.

In one embodiment, the ethylene/α-olefin/diene interpolymer has a $Mw_{(conv)}$ from 150,000 to 320,000 g/mole, preferably from 180,000 to 280,000 g/mole. In a further embodiment, the interpolymer is an EPDM terpolymer. In a further embodiment, the diene is ENB.

An ethylene/α-olefin/diene interpolymer, and preferably a terpolymer, may comprise a combination of two or more embodiments as described herein.

An ethylene/propylene/diene interpolymer, and preferably an EPDM terpolymer, may comprise a combination of two or more embodiments as described herein.

Ethylene/α-Olefin Interpolymers (Component A)

Ethylene/α-olefin interpolymers include polymers formed by polymerizing ethylene with one or more, and preferably one, C3-C10 α-olefin(s). Illustrative α-olefins include propylene, 1-butene, 1-pentene, 1-hexene, 4-methyl-1-pentene, 1-heptene, 1-octene, 1-nonene and 1-decene. Preferably, the α-olefin is propylene, 1-butene, 1-hexene or 1-octene. Preferred copolymers include ethylene/propylene (EP) copolymers, ethylene/butene (EB) copolymers, ethylene/hexene (EH) copolymers, ethylene/octene (EO) copolymers.

Commercial examples of suitable ethylene/α-olefin interpolymers include ENGAGE Polyolefin Elastomers available from The Dow Chemical Company; EXCEED and EXACT polymers available from ExxonMobil Chemical Company; and TAFMER polymers available from the Mitsui Chemical Company.

In one embodiment, the ethylene/α-olefin interpolymer has a melting point (Tm) greater than 40° C. preferably greater than 50° C., more preferably greater than 60° C., as determined by DSC. In a further embodiment, the ethylene/α-olefin interpolymer is an ethylene/α-olefin copolymer.

In one embodiment, the ethylene/α-olefin interpolymer has a melting point (Tm) less than 100° C., preferably less than 90° C., and more preferably less than 80° C., as determined by DSC. In a further embodiment, the ethylene/α-olefin interpolymer is an ethylene/α-olefin copolymer.

In one embodiment, the ethylene/α-olefin interpolymer has a density greater than, or equal to, 0.855 g/cc, preferably greater than, or equal to, 0.860 g/cc, more preferably greater than, or equal to, 0.870 g/cc. In a further embodiment, the ethylene/α-olefin interpolymer is an ethylene/α-olefin copolymer.

In one embodiment, the ethylene/α-olefin interpolymer has a density less than, or equal to, 0.910 g/cc, preferably less than, or equal to, 0.900 g/cc, more preferably less than, or equal to, 0.890 g/cc. In a further embodiment, the ethylene/α-olefin interpolymer is an ethylene/α-olefin copolymer.

In one embodiment, the ethylene/α-olefin interpolymer has a melt index (I2) greater than, or equal to, 0.1 g/10 min, preferably greater than, or equal to, 0.2 g/10 min, more preferably greater than, or equal to, 0.5 g/10 min. In a further embodiment, the ethylene/α-olefin interpolymer is an ethylene/α-olefin copolymer.

In one embodiment, the ethylene/α-olefin interpolymer has a melt index (I2) less than, or equal to, 10 g/10 min, preferably less than, or equal to, 5 g/10 min, more preferably less than, or equal to, 2 g/10 min. In a further embodiment, the ethylene/α-olefin interpolymer is an ethylene/α-olefin copolymer.

In one embodiment, the ethylene/α-olefin interpolymer has a melt index (I2) from 0.1 g/10 min to 10 g/10 min, preferably from 0.2 g/10 min to 5 g/10 min, more preferably from 0.5 g/10 min to 2 g/10 min. In a further embodiment, the ethylene/α-olefin interpolymer is an ethylene/α-olefin copolymer.

In one embodiment, the ethylene/α-olefin interpolymer has molecular weight distribution ($Mw_{(conv)}/Mn_{(conv)}$) from 1.1 to 4, preferably from 1.1 to 3.5, more preferably from 1.1 to 3, as determined by GPC. In a further embodiment, the ethylene/α-olefin interpolymer is an ethylene/α-olefin copolymer.

In one embodiment, the ethylene/α-olefin interpolymer has a percent crystallinity of less than, or equal to, 30 percent, preferably less than, or equal to, 20 percent, and more preferably less than, or equal to, 15 percent, as measured by DSC. In a further embodiment, the ethylene/α-olefin interpolymer is an ethylene/α-olefin copolymer.

In one embodiment, the ethylene/α-olefin interpolymer has a percent crystallinity of greater than, or equal to, 1 percent, preferably greater than, or equal to, 2 percent as measured by DSC. In a further embodiment, the ethylene/α-olefin interpolymer is an ethylene/α-olefin copolymer.

In one embodiment, the ethylene/α-olefin interpolymer is a homogeneously branched linear interpolymer, and preferably a copolymer, or a homogeneous branched substantially linear interpolymer, and preferably a copolymer.

The terms "homogeneous" and "homogeneously-branched" are used in reference to an ethylene/α-olefin interpolymer, in which the α-olefin comonomer is randomly distributed within a given polymer molecule, and all of the polymer molecules have the same or substantially the same comonomer-to-ethylene ratio. See discussion below.

In one embodiment, the ethylene/α-olefin interpolymer has a PRR (Processing Rheology Ratio) greater than, or equal to, 4, preferably greater than, or equal to, 8, more preferably greater than, or equal to, 12, even more preferably greater than, or equal to, 15. In a further embodiment, the ethylene/α-olefin interpolymer is an ethylene/α-olefin copolymer.

In one embodiment, the ethylene/α-olefin interpolymer has a PRR from 4 to 70, preferably from 8 to 70. In a further embodiment, the ethylene/α-olefin interpolymer is an ethylene/α-olefin copolymer.

In one embodiment, the ethylene/α-olefin interpolymer has a PRR from 12 to 60, preferably from 15 to 55, and more preferably from 18 to 50. In a further embodiment, the ethylene/α-olefin interpolymer is an ethylene/α-olefin copolymer.

Interpolymer viscosity is conveniently measured in poise (dyne-second/square centimeter (d-sec/cm2)) at shear rates within a range of 0.1-100 radian per second (rad/sec), at 190° C., under a nitrogen atmosphere, using a dynamic mechanical spectrometer (such as a RMS-800 or ARES from Rheometrics), under a dynamic sweep made from 0.1 to 100 rad/sec. The viscosities at 0.1 rad/sec and 100 rad/sec may be represented, respectively, as "V0.1" and "V100," with a ratio of the two referred to as "RR," and expressed as "V0.1/V100."

The PRR value is calculated by the formula:

PRR=RR+[3.82−interpolymer Mooney Viscosity ($ML1+4$ at 125° C.)]×0.3.

The PRR determination is described in U.S. Pat. No. 6,680,361 (see also equivalent WO 00/26268), fully incorporated herein by reference.

An ethylene/α-olefin interpolymer may comprise a combination of two or more embodiments as described herein.

An ethylene/α-olefin copolymer may comprise a combination of two or more embodiments as described herein.

Olefin-Based Polymers (Component B)

Olefin-based polymers include, but are not limited to, ethylene-based polymers and propylene-based polymers.

The olefin-based polymer of Component B has a melt viscosity less than, or equal to, 20,000 cP, preferably less than, or equal to, 16,000 cP, more preferably less than, or equal to, 10,000 cP, at 350° F. (177° C.). In a further embodiment, the olefin-based polymer is an olefin-based interpolymer.

In one embodiment, olefin-based polymer of Component B has a melt viscosity greater than, or equal to, 2,000 cP, preferably greater than, or equal to, 4,000 cP, more preferably greater than, or equal to, 5,000 cP, at 350° F. (177° C.). In a further embodiment, the olefin-based polymer is an olefin-based interpolymer.

In one embodiment, the olefin-based polymer of Component B has a melt viscosity from 2,000 cP to 20,000 cP, preferably from 4,000 cP to 16,000 cP, more preferably from 5,000 cP to 10,000 cP, at 350° F. (177° C.). In a further embodiment, the olefin-based polymer is an olefin-based interpolymer.

In addition to the olefin-based polymers described below, other suitable olefin-based polymers include Clariant's LICOCENE Performance Polymers and Idemitsu's LMPO polymers.

Ethylene/α-Olefin Interpolymers (Component B)

In one embodiment, the olefin-based polymer of Component B is an ethylene-based polymer, and preferably an ethylene-based interpolymer. In a further embodiment, the ethylene-based polymer is an ethylene/α-olefin interpolymer, and preferably an ethylene/α-olefin copolymer.

The ethylene/α-olefin interpolymer of Component B has a melt viscosity less than, or equal to, 20,000 cP, preferably less than, or equal to, 16,000 cP, more preferably less than, or equal to, 10,000 cP, at 350° F. (177° C.). In a further embodiment, the ethylene/α-olefin interpolymer is an ethylene/α-olefin copolymer.

In one embodiment, ethylene/α-olefin interpolymer of Component B has a melt viscosity greater than, or equal to, 2,000 cP, preferably greater than, or equal to, 4,000 cP, more preferably greater than, or equal to, 5,000 cP, at 350° F. (177° C.). In a further embodiment, the ethylene/α-olefin interpolymer is an ethylene/α-olefin copolymer.

In one embodiment, the ethylene/α-olefin interpolymer has a melt viscosity from 2,000 cP to 20,000 cP, preferably from 4,000 cP to 16,000 cP, more preferably from 5,000 cP to 10,000 cP, at 350° F. (177° C.). In a further embodiment, the ethylene/α-olefin interpolymer is an ethylene/α-olefin copolymer.

Preferred α-olefins include, but are not limited to, C3-C20 α-olefins, and preferably C3-C10 α-olefins. More preferred α-olefins include propylene, 1-butene, 1-pentene, 1-hexene, 1-heptene and 1-octene, and more preferably include propylene, 1-butene, 1-hexene and 1-octene.

In one embodiment, the ethylene/α-olefin interpolymer has a molecular weight distribution ($Mw_{(conv)}/Mn_{(conv)}$) less than, or equal to, 5, and preferably less than, or equal to, 4, and more preferably less than, or equal to, 3. More preferably the ethylene/α-olefin interpolymers have a molecular weight distribution from 1.1 to 3.5, and preferably from 1.1 to 3, and more preferably from 1.1 to 2.5. In a further embodiment, the ethylene/α-olefin interpolymer is an ethylene/α-olefin copolymer.

In one embodiment, the ethylene/α-olefin interpolymer has a melt index (I2) greater than, or equal to, 500 g/10 min, preferably greater than, or equal to, 800 g/10 min, and more preferably greater than, or equal to, 1000 g/10 min, as determined using ASTM D-1238-04 (190° C., 2.16 kg load). In a further embodiment, the ethylene/α-olefin interpolymer is an ethylene/α-olefin copolymer.

In one embodiment, the ethylene/α-olefin interpolymer has an apparent melt index (I2) greater than, or equal to, 500 g/10 min, preferably greater than, or equal to, 800 g/10 min, and more preferably greater than, or equal to, 1000 g/10 min (see U.S. Pat. No. 6,335,410); I2 (190° C./2.16 kg)=3.6126 $[10^{(log(\eta)-6.6928)/-1.1363}]$−9.3185, where η=melt viscosity, in cP, at 350° F.).

In one embodiment, the ethylene/α-olefin interpolymer has a percent crystallinity of less than, or equal to, 40 percent, preferably less than, or equal to, 30 percent, and more preferably less than, or equal to, 20 percent, as determined by DSC. In a further embodiment, the ethylene/α-olefin interpolymer is an ethylene/α-olefin copolymer.

In one embodiment, the ethylene/α-olefin interpolymer has a percent crystallinity of greater than, or equal to, 2 percent, preferably greater than, or equal to, 5 percent, and more preferably greater than, or equal to, 10 percent, as determined by DSC. In a further embodiment, the ethylene/α-olefin interpolymer is an ethylene/α-olefin copolymer.

In one embodiment, the ethylene/α-olefin interpolymer has a percent crystallinity from 2 to 30 percent, preferably from 5 to 25 percent, and more preferably from 10 to 20 percent, as determined by DSC. In a further embodiment, the ethylene/α-olefin interpolymer is an ethylene/α-olefin copolymer.

In one embodiment, the ethylene/α-olefin interpolymer has a density greater than, or equal to, 0.855 g/cc, preferably greater than, or equal to, 0.860 g/cc, more preferably greater than, or equal to, 0.865 g/cc. In a further embodiment, the ethylene/α-olefin interpolymer is an ethylene/α-olefin copolymer.

In one embodiment, the ethylene/α-olefin interpolymer has a density less than, or equal to, 0.900 g/cc, preferably less than, or equal to, 0.895 g/cc, more preferably less than, or equal to, 0.890 g/cc. In a further embodiment, the ethylene/α-olefin interpolymer is an ethylene/α-olefin copolymer.

In one embodiment, the ethylene/α-olefin interpolymers has a density from 0.855 g/cm$^3$ to 0.900 g/cm$^3$, and preferably from 0.860 g/cm$^3$ to 0.895 g/cm$^3$, and more preferably from 0.865 g/cm$^3$ to 0.890 g/cm$^3$. In a further embodiment, the ethylene/α-olefin interpolymer is an ethylene/α-olefin copolymer.

Some examples of ethylene/α-olefin copolymers include AFFINITY GA Polyolefin Plastomers, available from The Dow Chemical Company, and LICOCENE Performance Polymers from Clariant. Other examples of ethylene/α-olefin polymers include the ultra low molecular weight ethylene polymers described in U.S. Pat. Nos. 6,335,410, 6,054,544 and 6,723,810, each fully incorporated herein by reference.

In one embodiment, the ethylene/α-olefin interpolymer is a homogeneously branched linear interpolymer, and preferably a copolymer, or a homogeneous branched substantially linear interpolymer, and preferably a copolymer.

In one embodiment, the ethylene/α-olefin interpolymer is a homogeneously branched linear interpolymer, and preferably a copolymer.

In one embodiment, the ethylene/α-olefin interpolymer is a homogeneous branched substantially linear interpolymer, and preferably a copolymer.

The terms "homogeneous" and "homogeneously-branched" are used in reference to an ethylene/α-olefin interpolymer, in which the α-olefin comonomer is randomly distributed within a given polymer molecule, and all of the polymer molecules have the same or substantially the same comonomer-to-ethylene ratio.

The homogeneously branched linear ethylene interpolymers are ethylene polymers, which lack long chain branching, but do have short chain branches, derived from the comonomer polymerized into the interpolymer, and which are homogeneously distributed, both within the same polymer chain, and between different polymer chains. These ethylene/α-olefin interpolymers have a linear polymer backbone, no measurable long chain branching, and a narrow molecular weight distribution. This class of polymers is disclosed, for example, by Elston in U.S. Pat. No. 3,645,992, and subsequent processes to produce such polymers, using bis-metallocene catalysts, have been developed, as shown, for example, in EP 0 129 368; EP 0 260 999; U.S. Pat. No. 4,701,432; U.S. Pat. No. 4,937,301; U.S. Pat. No. 4,935,397; U.S. Pat. No. 5,055,438; and WO 90/07526; each incorporated herein by reference. As discussed, the homogeneously branched linear ethylene interpolymers lack long chain branching, just as is the case for the linear low density polyethylene polymers or linear high density polyethylene polymers. Commercial examples of homogeneously branched linear ethylene/α-olefin interpolymers include TAFMER polymers from the Mitsui Chemical Company, and EXACT and EXCEED polymers from ExxonMobil Chemical Company.

The homogeneously branched substantially linear ethylene/α-olefin interpolymers are described in U.S. Pat. Nos. 5,272,236; 5,278,272; 6,054,544; 6,335,410 and 6,723,810; each incorporated herein by reference. The substantially linear ethylene/α-olefin interpolymers have long chain branching. The long chain branches have the same comonomer distribution as the polymer backbone, and can have about the same length as the length of the polymer backbone. "Substantially linear," typically, is in reference to a polymer that is substituted, on average, with "0.01 long chain branches per 1000 carbons" to "3 long chain branches per 1000 carbons." The length of a long chain branch is longer than the carbon length of a short chain branch, formed from the incorporation of one comonomer into the polymer backbone. Commercial examples include AFFINITY Polyolefin Plastomers, available from The Dow Chemical Company.

Some polymers may be substituted with 0.01 long chain branches per 1000 total carbons to 3 long chain branch per 1000 total carbons, more preferably from 0.05 long chain branches per 1000 total carbons to 2 long chain branch per 1000 total carbons, and especially from 0.3 long chain branches per 1000 total carbons to 1 long chain branch per 1000 total carbons.

The substantially linear ethylene/α-olefin interpolymers form a unique class of homogeneously branched ethylene polymers. They differ substantially from the well-known class of conventional, homogeneously branched linear ethylene/α-olefin interpolymers, as discussed above, and, moreover, they are not in the same class as conventional heterogeneous "Ziegler-Natta catalyst polymerized" linear ethylene polymers (for example, ultra low density polyethylene (ULDPE), linear low density polyethylene (LLDPE) or high density polyethylene (HDPE), made, for example, using the technique disclosed by Anderson et al., in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

The homogeneously branched, substantially linear ethylene/α-olefin interpolymers useful in the invention have excellent processability, even though they have a relatively narrow molecular weight distribution. Surprisingly, the melt flow ratio (I10/I2), according to ASTM D 1238, of the substantially linear ethylene interpolymers can be varied widely, and essentially independently of the molecular weight distribution (Mw/Mn or MWD). This surprising behavior is contrary to conventional homogeneously branched linear ethylene interpolymers, such as those described, for example, by Elston in U.S. Pat. No. 3,645,992, and heterogeneously branched, conventional "Ziegler-Natta polymerized," linear polyethylene interpolymers, such as those described, for example, by Anderson et al., in U.S. Pat. No. 4,076,698. Unlike substantially linear ethylene interpolymers, linear ethylene interpolymers (whether homogeneously or heterogeneously branched) have rheological properties, such that, as the molecular weight distribution increases, the I10/I2 value also increases.

Long chain branching can be determined by using 13C Nuclear Magnetic Resonance (NMR) spectroscopy, and can be quantified using the method of Randall (Rev. Macromol. Chem. Phys., C29 (2 &3), 1989, p. 285-297), the disclosure of which is incorporated herein by reference. Two other methods are Gel Permeation Chromatography, couple with a Low Angle Laser Light Scattering detector (GPCLALLS), and Gel Permeation Chromatography, coupled with a Differential Viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301 (1949) and Rudin, A., Modern Methods of Polymer Characterization, John Wiley & Sons, New York (1991) pp. 103-112.

In contrast to "substantially linear ethylene polymer," "linear ethylene polymer" means that the polymer lacks measurable or demonstrable long chain branches, that is, the polymer is substituted with an average of less than 0.01 long chain branch per 1000 carbons.

The ethylene/α-olefin interpolymer may comprise a combination of two or more embodiments as described herein.

The ethylene/α-olefin copolymer may comprise a combination of two or more embodiments as described herein.

Ethylene/α-Olefin Multi-Block Interpolymers (Component B)

In one embodiment, the olefin-based polymer of Component B is an ethylene-based polymer. In a further embodiment, the ethylene-based polymer is an ethylene/α-olefin multi-block interpolymer, and preferably an ethylene/α-olefin multi-block copolymer.

The ethylene/α-olefin multi-block interpolymer of Component B has a melt viscosity less than, or equal to, 20,000 cP, preferably less than, or equal to, 16,000 cP, more preferably less than, or equal to, 10,000 cP, at 350° F. (177° C.). In a further embodiment, the ethylene/α-olefin multi-block interpolymer is an ethylene/α-olefin multi-block copolymer.

In one embodiment, ethylene/α-olefin multi-block interpolymer of Component B has a melt viscosity greater than, or equal to, 2,000 cP, preferably greater than, or equal to, 4,000 cP, more preferably greater than, or equal to, 5,000 cP, at 350° F. (177° C.). In a further embodiment, the ethylene/α-olefin multi-block interpolymer is an ethylene/α-olefin copolymer.

In one embodiment, the ethylene/α-olefin multi-block interpolymer has a melt viscosity from 2,000 cP to 20,000 cP, preferably from 4,000 cP to 16,000 cP, more preferably from 5,000 cP to 10,000 cP, at 350° F. (177° C.). In a further embodiment, the ethylene/α-olefin multi-block interpolymer is an ethylene/α-olefin multi-block copolymer.

Preferred α-olefins include, but are not limited to, C3-C20 α-olefins, and preferably C3-C10 α-olefins. More preferred α-olefins include propylene, 1-butene, 1-pentene, 1-hexene, 1-heptene and 1-octene, and more preferably include propylene, 1-butene, 1-hexene, and 1-octene.

Ethylene/α-olefin multi-block interpolymers and copolymers may be made with two catalysts, incorporating differing quantities of comonomer, and a chain shuttling agent.

An ethylene/α-olefin multi-block interpolymer, and preferably copolymer, has one or more of the following characteristics:

(1) an average block index greater than zero and up to about 1.0, and a molecular weight distribution, Mw/Mn, greater than about 1.3; or (2) at least one molecular fraction which elutes between 40° C. and 130° C. when fractionated using TREF, characterized in that the fraction has a block index of at least 0.5 and up to about 1; or (3) an Mw/Mn from about 1.7 to about 3.5, at least one melting point, Tm, in degrees Celsius, and a density, d, in grams/cubic centimeter, wherein the numerical values of Tm and d correspond to the relationship:

$$Tm > -6553.3 + 13735(d) - 7051.7(d)^2; \text{ or}$$

(4) an Mw/Mn from about 1.7 to about 3.5, and is characterized by a heat of fusion, ΔH in J/g, and a delta quantity, ΔT, in degrees Celsius, defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (5) an elastic recovery, Re, in percent at 300 percent strain and 1 cycle measured with a compression-molded coated substrate of the ethylene/α-olefin interpolymer, and has a density, d, in grams/cubic centimeter, wherein the numerical values of Re and d satisfy the following relationship when ethylene/α-olefin interpolymer is substantially free of a crosslinked phase: Re>1481−1629(d); or (6) a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s), and has a melt index, density, and molar comonomer content (based on the whole polymer) within 10 percent of that of the ethylene/α-olefin interpolymer; or (7) a storage modulus at 25° C., G'(25° C.), and a storage modulus at 100° C., G'(100° C.), wherein the ratio of G' (25° C.) to G'(100° C.) is in the range of about 1:1 to about 9:1.

In one embodiment, the ethylene/α-olefin multi-block interpolymer, and preferably copolymer, has one or more of characteristics (1) through (3), preferably (1) and (2), and more preferably (1).

The term "multi-block copolymer" or "segmented copolymer" refers to a polymer comprising two or more chemically distinct regions or segments (referred to as "blocks"), preferably joined in a linear manner, that is, a polymer comprising chemically differentiated units, which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or Mw/Mn), block length distribution, and/or block number distribution due to the unique process making of the copolymers. More specifically, when produced in a continuous process, the polymers desirably possess PDI from 1.7 to 2.9, preferably from 1.8 to 2.5, more preferably from 1.8 to 2.2, and most preferably from 1.8 to 2.1. When produced in a batch or semi-batch process, the polymers possess PDI from 1.0 to 2.9, preferably from 1.3 to 2.5, more preferably from 1.4 to 2.0, and most preferably from 1.4 to 1.8.

In one embodiment, the ethylene/α-olefin multi-block interpolymer has a density of less than, or equal to, 0.900 g/cc, preferably less than, or equal to, 0.895 g/cc, more preferably less than, or equal to, 0.890 g/cc, even more preferably less than, or equal to, 0.885 g/cc. In a further embodiment, the ethylene/α-olefin multi-block interpolymer is an ethylene/α-olefin multi-block copolymer.

In one embodiment, the ethylene/α-olefin multi-block interpolymer has a density greater than, or equal to, 0.850 g/cc, preferably greater than, or equal to, 0.855 g/cc, and more preferably greater than, or equal to, 0.860 g/cc. Density is measured by the procedure of ASTM D-792-08. In a further embodiment, the ethylene/α-olefin multi-block interpolymer is an ethylene/α-olefin multi-block copolymer.

In one embodiment, the ethylene/α-olefin multi-block interpolymer has a melting point of greater than 90° C., preferably greater than 100° C. The melting point is measured by Differential Scanning calorimetry (DSC) method described in U.S. Publication 2006/0199930 (WO 2005/090427), incorporated herein by reference. In a further embodiment, the ethylene/α-olefin multi-block interpolymer is an ethylene/α-olefin multi-block copolymer.

In one embodiment, the ethylene/α-olefin multi-block interpolymer has a melt index (I2) greater than, or equal to, 500 g/10 min, preferably greater than, or equal to, 800 g/10 min, and more preferably greater than, or equal to, 1000 g/10 min, as determined using ASTM D-1238-04 (190° C., 2.16 kg load). In a further embodiment, the ethylene/α-olefin multi-block interpolymer is an ethylene/α-olefin multi-block copolymer.

In one embodiment, the ethylene/α-olefin interpolymer has an apparent melt index (I2) greater than, or equal to, 500 g/10 min, preferably greater than, or equal to, 800 g/10 min, and more preferably greater than, or equal to, 1000 g/10 min (see U.S. Pat. No. 6,335,410); I2 (190° C./2.16 kg)=3.6126 $[10^{(log(\eta)-6.6928)/-1.1363}]$–9.3185, where η=melt viscosity, in cP, at 350° F.).

In one embodiment, the ethylene/α-olefin multi-block interpolymer has a percent crystallinity of less than, or equal to, 40 percent, preferably less than, or equal to, 30 percent, and more preferably less than, or equal to, 20 percent, as determined by DSC. In a further embodiment, the ethylene/α-olefin multi-block interpolymer is an ethylene/α-olefin multi-block copolymer.

In one embodiment, the ethylene/α-olefin multi-block interpolymer has a percent crystallinity of greater than, or equal to, 2 percent, preferably greater than, or equal to, 5 percent, and more preferably greater than, or equal to, 10 percent, as determined by DSC.

In a further embodiment, the ethylene/α-olefin multi-block interpolymer is an ethylene/α-olefin multi-block copolymer.

In one embodiment, the ethylene/α-olefin multi-block interpolymer has a percent crystallinity from 2 to 30 percent, preferably from 5 to 25 percent, and more preferably from 10 to 20 percent, as determined by DSC. In a further embodiment, the ethylene/α-olefin multi-block interpolymer is an ethylene/α-olefin copolymer.

The ethylene multi-block interpolymers and copolymers and their preparation and use, are more fully described in the following: WO 2005/090427, US2006/0199931, US2006/0199930, US2006/0199914, US2006/0199912, US2006/0199911, US2006/0199910, US2006/0199908, US2006/0199907, US2006/0199906, US2006/0199905, US2006/0199897, US2006/0199896, US2006/0199887, US2006/0199884, US2006/0199872, US2006/0199744, US2006/0199030, US2006/0199006 and US2006/0199983; each is incorporated herein by reference.

An ethylene/α-olefin multi-block interpolymer may comprise a combination of two or more embodiments as described herein.

An ethylene/α-olefin multi-block copolymer may comprise a combination of two or more embodiments as described herein.

Propylene-Based Polymers (Component B)

In one embodiment, the olefin-based polymer of Component B is a propylene-based polymer. In a further embodiment, the propylene-based polymer is a propylene/α-olefin interpolymer, and preferably a copolymer, or a propylene/ethylene interpolymer, and preferably a copolymer.

The propylene-based polymer of Component B has a melt viscosity less than, or equal to, 20,000 cP, preferably less than, or equal to, 16,000 cP, more preferably less than, or equal to, 10,000 cP, at 350° F. (177° C.). In a further embodiment, the propylene-based polymer is a propylene/α-olefin interpolymer, and preferably a propylene/α-olefin copolymer. In another embodiment, the propylene-based polymer is a propylene/ethylene interpolymer, and preferably a propylene/ethylene copolymer.

In one embodiment, propylene-based polymer of Component B has a melt viscosity greater than, or equal to, 2,000 cP, preferably greater than, or equal to, 4,000 cP, more preferably greater than, or equal to, 5,000 cP, at 350° F. (177° C.). In a further embodiment, the propylene-based polymer is a propylene/α-olefin interpolymer, and preferably a propylene/α-olefin copolymer. In another embodiment, the propylene-based polymer is a propylene/ethylene interpolymer, and preferably a propylene/ethylene copolymer.

In one embodiment, the propylene-based polymer has a melt viscosity from 2,000 cP to 20,000 cP, preferably from 4,000 cP to 16,000 cP, more preferably from 5,000 cP to 10,000 cP, at 350° F. (177° C.). In a further embodiment, the propylene-based polymer is a propylene/α-olefin interpolymer, and preferably a propylene/α-olefin copolymer. In another embodiment, the propylene-based polymer is a propylene/ethylene interpolymer, and preferably a propylene/ethylene copolymer.

Preferred comonomers include, but are not limited to, C2 and C4-C20 α-olefins, and preferably C2 and C4-C10 α-olefins. Preferred comonomers include ethylene, 1-butene, 1-pentene, 1-hexene, 1-heptene and 1-octene, and more preferably include ethylene, 1-butene, 1-hexene and 1-octene, and even more preferably ethylene.

Suitable propylene-base polymers include VERSIFY Plastomers (The Dow Chemical Company), VISTAMAXX polymers (ExxonMobil Chemical Co.), LICOCENE polymers (Clariant), EASTOFLEX polymers (Eastman Chemical Co.), REXTAC polymers (Hunstman), and VESTOPLAST polymers (Degussa), and other propylene-based polymers known in the art.

In one embodiment, the propylene-based polymer has a molecular weight distribution less than, or equal to, 5, preferably less than, or equal to, 4, more preferably less than, or equal to, 3.5. More preferably the propylene-based polymer has a molecular weight distribution from 1.5 to 3.5, and more preferably from 2 to 3. In a further embodiment, the propylene-based polymer is a propylene/α-olefin interpolymer, and preferably a propylene/α-olefin copolymer. In another embodiment, the propylene-based polymer is a propylene/ethylene interpolymer, and preferably a propylene/ethylene copolymer.

In one embodiment, the propylene-based polymer has a percent crystallinity of less than, or equal to, 60 percent, preferably less than, or equal to, 40 percent, and more preferably less than, or equal to, 35 percent, as measured by DSC. In a further embodiment, the propylene-based polymer is a propylene/α-olefin interpolymer, and preferably a propylene/α-olefin copolymer. In another embodiment, the propylene-based polymer is a propylene/ethylene interpolymer, and preferably a propylene/ethylene copolymer.

In one embodiment, the propylene-based polymer has a percent crystallinity of greater than, or equal to, 2 percent, preferably greater than, or equal to, 5 percent, and more preferably greater than, or equal to, 8 percent, as measured by DSC. In a further embodiment, the propylene-based polymer is a propylene/α-olefin interpolymer, and preferably a propylene/α-olefin copolymer. In another embodiment, the propylene-based polymer is a propylene/ethylene interpolymer, and preferably a propylene/ethylene copolymer.

In one embodiment, the propylene-based polymer has a density greater than, or equal to, 0.855 g/cc, preferably greater than, or equal to, 0.860 g/cc, more preferably greater than, or equal to, 0.865 g/cc. In a further embodiment, the propylene-based polymer is a propylene/α-olefin interpolymer, and preferably a propylene/α-olefin copolymer. In another embodiment, the propylene-based polymer is a propylene/ethylene interpolymer, and preferably a propylene/ethylene copolymer.

In one embodiment, the propylene-based polymer has a density less than, or equal to, 0.895 g/cc, preferably less than, or equal to, 0.890 g/cc, more preferably less than, or equal to, 0.885 g/cc. In a further embodiment, the propylene-based polymer is a propylene/α-olefin interpolymer, and preferably a propylene/α-olefin copolymer. In another embodiment, the propylene-based polymer is a propylene/ethylene interpolymer, and preferably a propylene/ethylene copolymer.

A propylene-based polymer may comprise a combination of two or more embodiments as described herein.

A propylene/α-olefin interpolymer, and copolymer, may comprise a combination of two or more embodiments as described herein.

A propylene/ethylene interpolymer, and copolymer, may comprise a combination of two or more embodiments as described herein.

Crosslinking Agents

Suitable crosslinking agents include, but are not limited to, sulfur-containing compounds and peroxides. Sulfur-containing compounds, include, but are not limited to, elemental sulfur, 4,4'-dithiodimorpholine, thiuram di- and polysulfides, alkylphenol disulfides, and 2-morpholino-dithiobenzothiazole. Elemental sulfur can be a crystalline elemental sulfur or an amorphous elemental sulfur, and either type can be in pure form or supported on an inert carrier. An example of a supported sulfur is Rhenogran S-80 (80% S and 20% inert carrier) from Rhein Chemie.

Peroxides include, but are not limited to, di-tertbutyl peroxide, tertbutylcumyl peroxide, dicumyl peroxide, 2,5-dimethyl-2,5-di-(tertbutylperoxy)hexane, di-(tertbutylperoxyisopropyl)benzene, tertbutyl peroxybenzoate, and 1,1-di-(tertbutylperoxy)-3,3,5-trimethylcyclohexane.

In one embodiment, the crosslinking agent is selected from sulfur-containing compounds and peroxides.

In one embodiment, the crosslinking agent is selected from sulfur-containing compounds.

In one embodiment, the crosslinking agent is selected from peroxides.

In one embodiment, the crosslinking agent is present in an amount from about 1 to 10 parts by weight, based upon 100 parts of the polymers in the composition.

Crosslinking temperatures and time employed are typical. Temperatures ranging from about 120° C. to about 225° C., and times ranging from about one minute to about 120 minutes can be used.

A crosslinking agent may comprise a combination of two or more embodiments as described herein.

Additives

In one embodiment, an inventive composition comprises at least one additive. Suitable additives include, but are not limited to, fillers, antioxidants, UV stabilizers, foaming agents, flame retardants, colorants or pigments, and combinations thereof.

In one embodiment, the composition comprises at least one filler. In a further embodiment, the filler is selected from carbon black, talc, calcium carbonate, clay or combinations thereof. In one embodiment, the filler is present in an amount less than, or equal to, 50 weight percent, preferably less than, or equal to, 40 weight percent, more preferably less than, or equal to, 30 weight percent, based on the weight of the composition. In one embodiment, the filler is present in an amount greater than, or equal to, 2 weight percent, preferably greater than, or equal to, 5 weight percent, more preferably greater than, or equal to, 10 weight percent based on the weight of the composition. In one embodiment, the filler is present in an amount from 5 to 40 weight percent, preferably from 10 to 30 weight percent, based on the weight of the composition.

Antioxidants include, but are not limited to, hindered phenols, bisphenols, and thiobisphenols; substituted hydroquinones; tris(alkylphenyl)phosphites; dialkylthiodipropionates; phenylnaphthylamines; substituted diphenylamines; dialkyl, alkyl aryl, and diaryl substituted p-phenylene diamines; monomeric and polymeric dihydroquinolines; 2-(4-hydroxy-3,5-t-butylaniline)-4,6-bis(octylthio)1,3,5-triazine; hexahydro-1,3,5-tris-β-(3,5-di-t-butyl-4-hydroxyphenyl)propionyl-s-triazine; 2,4,6-tris(n-1,4-dimethylpentylphenylene-diamino)-1,3,5-triazine; and tris-(3,5-di-t-butyl-4-hydroxybenzyl)isocyanurate.

Applications

The invention also provides for an article comprising at least one component comprising an inventive composition. Articles include, but are not limited to extruded profiles, foams, weather strips, belts, hoses, wire and cable jacketing, tubes, flooring materials, gaskets, molded goods, sheets, and extruded parts. Additional articles include automotive parts (for example, dashboards and window seals), computer parts, building materials, household appliances, toys, and footwear components.

Compositions may be formed into a finished article of manufacture by any one of a number of conventional processes and apparatus. Illustrative processes include, but are not limited to, extrusion, calendaring, injection molding, compression molding, and other typical processes known in the art. For example, articles can be prepared by injection molding, extrusion, extrusion followed by thermoforming, low pressure molding, compression molding, and the like.

DEFINITIONS

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer), and the term interpolymer as defined hereinafter.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomers.

The term, "ethylene-based polymer," as used herein, refers to a polymer that comprises, in polymerized form, a majority amount of ethylene monomer (based on the weight of the polymer), and optionally may comprise one or more comonomers. For an ethylene-based interpolymer, the polymerized ethylene monomer is present in a greater amount as compared to each comonomer(s).

The term, "ethylene/α-olefin interpolymer," as used herein, refers to an interpolymer that comprises, in polymerized form, a majority amount of ethylene monomer (based on the weight of the interpolymer), and at least one α-olefin. As used in the context of this disclosure, ethylene/α-olefin interpolymer excludes ethylene/α-olefin multi-block interpolymers.

The term, "ethylene/α-olefin copolymer," as used herein, refers to a copolymer that comprises, in polymerized form, a majority amount of ethylene monomer (based on the weight of the copolymer), and an α-olefin, as the only two monomer types. As used in the context of this disclosure, ethylene/α-olefin copolymer excludes ethylene/α-olefin multi-block copolymers.

The term, "propylene-based polymer," as used herein, refers to a polymer that comprises, in polymerized form, a majority amount of propylene monomer (based on the weight of the polymer), and optionally may comprise one or more comonomers.

The term, "propylene/α-olefin interpolymer," as used herein, refers to an interpolymer that comprises, in polymerized form, a majority amount of propylene monomer (based on the weight of the interpolymer), and at least one α-olefin.

The term, "propylene/α-olefin copolymer," as used herein, refers to a copolymer that comprises, in polymerized form, a majority amount of propylene monomer (based on the weight of the copolymer), and an α-olefin, as the only two monomer types.

The term, "propylene/ethylene interpolymer," as used herein, refers to an interpolymer that comprises, in polymerized form, a majority amount of propylene monomer (based on the weight of the interpolymer), and ethylene.

The term, "propylene/ethylene copolymer," as used herein, refers to a copolymer that comprises, in polymerized form, a majority amount of propylene monomer (based on the weight of the copolymer), and ethylene, as the only two monomer types.

The phrase "thermally treating," as used herein, refers to the application of heat and/or radiation to a composition or material, to increase the temperature of the composition or material.

The term "parts," in reference to an amount of a component, refers to the weight parts of a component in a composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Polymer density was measured in accordance with ASTM D-792-08.

Melt Viscosity

Melt viscosity was measured in accordance with ASTM D 3236 (350° F.), using a Brookfield Digital Viscometer (Model DV-II+, version 3), and disposable aluminum sample chambers. The spindle used, in general, is a SC-31 hot-melt spindle, suitable for measuring viscosities in the range from 10 to 100,000 centipoise. The sample is poured into the chamber, which is, in turn, inserted into a Brookfield Thermoset, and locked into place. The sample chamber has a notch on the bottom that fits the bottom of the Brookfield Thermoset, to ensure that the chamber is not allowed to turn when the spindle is inserted and spinning. The sample (approximately 8-10 grams of resin) is heated to the required temperature, until the melted sample is about one inch below the top of the sample chamber. The viscometer apparatus is lowered and the spindle submerged into the sample chamber. Lowering is continued until the brackets on the viscometer align on the Thermoset. The viscometer is turned on, and set to operate at a shear rate which leads to a torque reading in the range of 40 to 60 percent of the total torque capacity, based on the RPM output of the viscometer. Readings are taken every minute for about 15 minutes, or until the values stabilize, at which point, a final reading is recorded.

Melt Index

Melt index (I2) of an ethylene-based polymer is measured in accordance with ASTM D-1238-04, condition 190° C./2.16 kg. Melt index (I5) of an ethylene-based polymer is measured in accordance with ASTM D-1238-04, condition 190° C./5.0 kg. Melt index (I10) of an ethylene-based polymer is measured in accordance with ASTM D-1238-04, condition 190° C./10.0 kg. High load melt index (I21) of an ethylene-based polymer is measured in accordance with ASTM D-1238-04, condition 190° C./21.0 kg. For propylene-based polymers, the melt flow rate (MFR) is measured in accordance with ASTM D-1238-04, condition 230° C./2.16 kg.

Differential Scanning Calorimetry (DSC)

Differential Scanning Calorimetry (DSC) is used to measure crystallinity in ethylene-based (PE) samples and propylene-based (PP) samples. A sample is pressed into a thin film at a temperature of 190° C. (around 20,000 psi for 30 seconds, air). About 5 to 8 mg of film sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)×100 (for PE)).

Unless otherwise stated, melting point(s) ($T_m$) of each polymer is determined from the second heat curve, and the crystallization temperature ($T_c$) is determined from the first cooling curve.

Mooney Viscosity of Polymer

Polymer Mooney Viscosity (ML1+4 at 125° C.) is measured in accordance with ASTM 1646-04, with a one minute preheat time and a four minute rotor operation time. The instrument is an Alpha Technologies Rheometer MDR 2000.

Gel Permeation Chromatography (GPC)

Polymer molecular weight is characterized by high temperature, triple detector Gel Permeation Chromatography (3D-GPC). The chromatographic system consists of a Polymer Laboratories (Amherst, Mass., now part of Varian, Inc, Shropshire, UK) "PL-GPC 210" high temperature chromatograph, equipped with a concentration detector (RI), a Precision Detectors (Amherst, Mass.) 2-angle laser light scattering detector, Model 2040, and a 4-capillary differential viscometer detector, Model 220, from Viscotek (Houston, Tex.). The 15° angle of the light scattering detector is used for calculation purposes.

Data collection is performed using VISCOTEK TriSEC software version 3 and a 4-channel VISCOTEK Data Manager DM400. The system is equipped with an on-line ERC-3415α four channel degasser system from ERC Inc (Tokyo, JP). The carousel compartment is operated at 150° C. for polyethylene and 85° C. for EPDM, and the column compartment is operated at 150° C. The columns are four Polymer Lab Mix-A 30 cm, 20 micron columns. The polymer solutions are prepared in 1,2,4-trichlorobenzene (TCB). The samples are prepared at a concentration of 0.1 grams of polymer in 50 ml of TCB. The chromatographic solvent and the sample preparation solvent contain 200 ppm of butylated hydroxytoluene (BHT). Both solvent sources are nitrogen purged. Polyethylene samples are stirred gently at 160° C. for four hours. EPDM samples are stirred gently at 160° C. for one hour. For carbon black containing samples, carbon black is removed by a "one-time filtration" that is performed at 150° C., under a nitrogen pressurized flow through a pre-heated layer of PERLITE in a ceramic filter. The injection volume is 200 µl, and the flow rate is 1.0 ml/minute.

Calibration of the GPC column set is performed with 21 narrow, molecular weight distribution polystyrene standards. The molecular weights of the standards range from 580 to 8,400,000, and are arranged in 6 "cocktail" mixtures, with at least a decade of separation between individual molecular weights.

The polystyrene standard peak molecular weights are converted to polyethylene molecular weights using the following equation (as described in Williams and Ward, J. Polym. Sci., Polym. Let., 6, 621 (1968)): Mpolyethylene=A×(Mpolystyrene)$^B$ (1A), where M is the molecular weight, A has a value of 0.39 and B is equal to 1.0. A fourth order polynomial is used to fit the respective polyethylene-equivalent calibration points.

The total plate count of the GPC column set is performed with EICOSANE (prepared at 0.04 g in 50 milliliters of TCB, and dissolved for 20 minutes with gentle agitation.) The plate count and symmetry are measured on a 200 microliter injection according to the following equations:

PlateCount=5.54*(RV at Peak Maximum/(Peak width at ½ height))^2 (2A), where RV is the retention volume in milliliters, and the peak width is in milliliters.

Symmetry=(Rear peak width at one tenth height−RV at Peak Maximum)/(RV at Peak Maximum−Front peak width at one tenth height) (3A), where RV is the retention volume in milliliters, and the peak width is in milliliters. The Systematic Approach for the determination of multi-detector offsets is done in a manner consistent with that published by Balke, Mourey, et. al (Mourey and Balke, Chromatography Polym. Chpt 12, (1992)) (Balke, Thitiratsakul, Lew, Cheung, Mourey, Chromatography Polym. Chpt 13, (1992)). Optimizing dual detector, log molecular weight results from a broad polyethylene of 115,000 to the narrow standard column calibration results, from the narrow standards calibration curve, is done using in-house software. The molecular weight data for off-set determination was obtained in a manner consistent with that published by Zimm (Zimm, B. H., J Chem. Phys., 16, 1099 (1948)) and Kratochvil (Kratochvil, P., Classical Light Scattering from Polymer Solutions, Elsevier, Oxford, N.Y. (1987)). The overall injected concentration, used for the determination of the molecular weight, is obtained from the sample refractive index, increment area, and the RI detector calibration from a linear polyethylene homopolymer of 115,000 Dalton molecular weight. The refractive index increment (dn/dc) for polyethylene is −0.104 mL/g and dn/dc for EODM is −0.094 mL/g. The chromatographic concentrations are assumed low enough to eliminate addressing 2nd Virial coefficient effects (concentration effects on molecular weight).

The calculations of Mn, Mw, and Mz based on GPC (conventional (conv) GPC for Mn, Mw and Mz) results using the RI detector are determined from the following equations:

$$\overline{Mn} = \frac{\sum_i RI_i}{\sum_i (RI_i / M_{calibration_i})}, \quad (4A)$$

$$\overline{Mw} = \frac{\sum_i (RI_i * M_{cal_i})}{\sum_i RI_i}, \quad (5A)$$

$$\overline{Mz} = \frac{\sum_i (RI_i * M_{cal_i}^2)}{\sum_i (RI_i * M_{cal_i})}. \quad (6A)$$

Another form of molecular weight average is the viscosity average which can be calculated using Equation 7A:

$$\overline{Mz} = \left( \frac{\sum_i (RI_i * M_{cal_i}^{\alpha+1})}{\sum_i (RI_i)} \right)^{1/\alpha}, \quad (7A)$$

where α is a material dependent parameter which relates the intrinsic viscosity ([η]) to the molecular weight of the polymer.

In addition to the above calculations, a set of alternative values [Mw(abs), Mz(abs), Mz (BB) and MZ+1 (BB)] values are also calculated with the method proposed by Yau and Gillespie, Polymer, 42, 8947-8958 (2001), and determined from the following equations:

$$\overline{Mw}(abs) = K_{LS} * \frac{\sum_i (LS_i)}{\sum_i (IR_i)}, \quad (8A)$$

where, $K_{LS}$=LS-MW calibration constant, $$\overline{Mz}(abs) = \frac{\sum_i RI_i * (LS_i / RI_i)^2}{\sum_i RI_i * (LS_i / RI_i)}, \quad (9A)$$

$$\overline{Mz}(BB) = \frac{\sum_i (LS_i * Mcalibration_i)}{\sum_i (LS_i)}, \quad (10A)$$

$$\overline{M_{z+1}}(BB) = \frac{\sum_i (LS_i * Mcalibration_i^2)}{\sum_i (LS_i * Mcalibration_i)}, \quad (11A)$$

where $LS_i$ is the 15 degree LS signal, and the Mcalibration uses equation 1A, and the LS detector alignment is as described previously.

In order to monitor the deviations over time, which may contain an elution component (caused by chromatographic changes) and a flow rate component (caused by pump changes), a late eluting narrow peak is generally used as a "flow rate marker peak." A flow rate marker is therefore established based on the air peak in TCB, or a drop of decane flow marker dissolved in the eluting sample prepared in TCB. Flow rate marker is used to linearly correct the flow rate for all samples, by alignment of the air peaks or decane peaks. Any changes in the time of the marker peak are then assumed to be related to a linear shift in both flow rate and chromatographic slope.

The plate count for the chromatographic system (based on EICOSANE as discussed previously) should be greater than 22,000, and symmetry should be between 1.00 and 1.12.

Compression Set

Compression Set (CS) was measured on the cured sample according to ASTM D395. Each test sample (26 mm diameter) was formed from four plies of (each ply "3 mm thickness") of uncured formulation that had been passed through a roll mill (see Experimental section below). The test sample was compression molded at 160° C. (sulfur cured) or 175° C. (peroxide cure), pressure about 30,000 psi, for "t95+15 minutes (t95 as measured by MDR)" to form a cured sample. The actual thickness of the cured sample was measured, and the sample was placed between two metal plates, and compressed "25+/31 1%" to a thickness of about 75 percent of the original thickness (=$h_n$), for a set time and at a set temperature. After the compression period, the sample was removed from the plates. The thickness of the sample was measured after a "30 minute equilibration" at ambient conditions (typically, 23° C. and 50% relative humidity).

The Compression Set was calculated as the percentage of the original deflection, measured after the material is allowed to recover at standard conditions for 30 minutes. Percent Compression Set was calculated using the formula: $C=[(h_0-h_i)/(h_0-h_n)]\times 100$, where $h_0$ is the original specimen thickness, $h_i$ is the specimen thickness after testing, and $h_n$ is the spacer thickness.

Mooney Viscosity—Polymer Formulation

Mooney viscosity (ML1+4 at 100° C.) of a polymer formulation was measured in accordance with ASTM 1646-04, with a one minute preheat time and a four minute rotor operation time. The instrument was an Alpha Technologies Rheometer MV2000E.

MDR

All the curing dynamics were measured by MDR (Rheometer MDR 2000 (Alpha Technologies)). The curing curve (torque vs. time), and other data, such as, for example, t10 and t90, were recorded by the rheometer. Each sample was measured at 160° C. (sulfur cure) or 175° C. (peroxide cure), at an oscillating frequency of 1.67 Hz, and an oscillation amplitude of 0.5°.

The ML value and the MH value refer to the minimum torque and maximum torque, respectively, measured during a test, at the specified test temperature. The t10, t90 and t95 values are the time for the torque to change 10 percent, 90 percent, and 95 percent, respectively, relative to the difference between MH and ML (or "MH−ML"). The "ts2 at cure temperature" value represents the anti-scorch property (the higher the better), and is the time for the torque to increase two units (dNm), relative to the ML value. The ML value and the MH value are generated by the rheometer.

The cure rate can be obtained from the slope of the generated MDR curve by calculating the slope of the curve, as follows:

$$\text{Cure rate}(dNm/\text{min}) = \frac{(MH-ML)\times 90\% - 2}{t90 - ts2}.$$

The ts2, t10, t90 and t95 values were measured in accordance with ASTM D5289-07, at the temperature of cure.

Mooney Scorch

The Mooney Scorch (125° C.) was measured on the uncured formulations using an Alpha Technologies Rheometer MV 2000E. Sample size was about 25-35 grams. The tests were run at 125° C. using the "small" rotor, as described in ASTM D1646-04. The t3, t5 and t10 data (time taken for the reading to increase by 3, 5 and 10 Mooney units, respectively) were tabulated. The data was analyzed using LABLINE 2001 software. Machine parameters were as follows: rotation speed of 2 RPM, and temperature range from room temperature to 250° C. The t5, t10 and t30 were measured in accordance with ASTM D1646-04.

Mechanical Properties

Tensile properties (100% Modulus, Ultimate Tensile), Modulus and Percent Elongation (stress versus strain), and Ultimate Elongation, were each measured according to ASTM D412, using cured samples cut to the T2 shape (dumbbell T2 at 23° C.; overall length=75 mm/width of ends=12.5 mm/length of narrow=25 mm/transition radius inside=12.5 mm; cut in machine direction). These properties were measured using a tensile tester manufactured by INSTRON (Model No. 4606), and a strain rate of 500 mm/min. Cured samples were prepared by thermally treating an uncured sheet (roll mill—see Experimental section) at 160° C. (sulfur) or 175° C. (peroxide) for "t95 (MDR)+3 minutes."

Hardness

Compound hardness was measured to Shore A, according to ASTM D2240-00, at 23° C., using a SHORE Durometer Hardness Tester. Cured samples were cut to the T2 shape (cut in machine direction), as discussed above. The stylus contacted the cured specimen for three seconds, before the reading was taken. Cured samples were prepared by thermally treating an uncured sheet (roll mill—see Experimental section) at 160° C. (sulfur) or 175° C. (peroxide) for "t95 (MDR)+3 minutes."

C-Tear Strength

C-Tear Strength was measured in according to ASTM D624-00. Cured samples were cut using a "die C" in machine direction. Cured samples were prepared by thermally treating an uncured sheet (roll mill—see Experimental section) at 160° C. (sulfur) or 175° C. (peroxide) for "t95 (MDR)+3 minutes."

Temperature Retraction

Temperature Retraction (TR) was measured in accordance with ASTM D1329-08. This test measures low temperature properties.

Heat Aging

Cured samples were heat aged in accordance with ASTM D573 (70 hours at 125° C. or 150° C.). The cured samples were cut to the T2 shape (cut in machine direction), as discussed above. Cured samples were prepared by thermally treating an uncured sheet (roll mill—see Experimental section) at 160° C. (sulfur) or 175° C. (peroxide) for "t95 (MDR)+3 minutes."

Off-Gas

The level of off-gas was measured using a procedure based upon ASTM D4526, using a Hewlett Packard Model 6890 Gas Chromatograph, equipped with a HP7694 headspace sampler. For this method a cured sample was thermally treated, and the amount of off-gas was determined. Each cured sample was prepared by compression molding the uncured sample at 160° C. (sulfur cured) or 175° C. (peroxide cure), pressure about 30,000 psi, for "t95+15 minutes (t95 as measured by MDR)." For this test, a "10 gram cured sample" was placed into a clean glass container, which was immediately sealed, heated, and held at 110° C. for 22 hours. A "vapor space" gas chromatographic analysis was used to determine the amount of volatile components in each test sample. The data reported was the concentration (ppm) of hydrocarbon material of estimated molecular weight of 126 grams per mole or less.

The following examples illustrate, but do not, either explicitly or by implication, limit the present invention.

EXPERIMENTAL

EPDM 65 is an ethylene/propylene/ENB terpolymer with a Mooney Viscosity (ML 1+4 at 125° C.) of 65±4, an ethylene content of 50.0±1.5 weight percent, and an ENB content of 7.5±0.5 weight percent.

EO19 is an ethylene/octene copolymer with a density of 0.870±0.003 g/cc, a melt viscosity of 8195±1395 cP at 350° F. (177° C.), an "apparent" melt index ($I_2$) of about 1000 g/10 min at 190° C./2.16 kg, and a percent crystallinity around 16. Melt index (apparent) was calculated from the following equation (see U.S. Pat. No. 6,335,410): $I_2$ (190° C./2.16 kg)=3.6126[$10^{(log(\eta)-6.6928)/-1.1363}$]−9.3185, where η=melt viscosity, in cP, at 350° F.

Polymer formulations are shown in Table 1 below. The rheology, mechanical and aging properties are shown in Tables 2-4.

agents (peroxide and coagent, or sulfur and accelerators), were added at once, and mixed at about 50 RPM, until the formulation reached a temperature of about 80-85° C. The ram was lifted, swept, and the crosslinking agents were added. The ram was re-lowered, and the formulation mixed to 100° C. (about 60-90 seconds to reach 100° C.). After this time, the "drop door" below the mixer was opened, and the uncured formulation was allowed to fall into a collection pan.

Sheets of uncured formulation, approximately "3 mm thick" were obtained by passing the above formulation between the rolls of a "6 inch," two-roll mill (Reliable Rubber & Plastic Machine C. Inc., Reeves 6 Inch Model). The temperature of the water circulating within the rolls was maintained at about 70-75° C., and the roll speed was 20 RPM.

Sheets of the cured formulation were obtained by compression molding the uncured sheet from the above roll mill. Samples about "15 cm×15 cm" were cured by compression molding (PRI Press, 100 Ton Press) a section of the above sheet, following ASTM D3182 (2001), into "3 mm thick" plaques. The cure time was "t95 plus three minutes," at the desired curing temperature (sulfur formulations were cured at

TABLE 1

Polymer Formulations

| Sample | Comp. Ex. 1A | Comp. Ex. 2A | Ex. 1A | Comp. Ex. 1B | Comp. Ex. 2B | Ex. 1B |
|---|---|---|---|---|---|---|
| Density [g/cc] | 1.435 | 1.425 | 1.43 | 1.09 | 1.077 | 1.083 |
| EPDM 65 | 507.01 | 503.43 | 505.25 | 511.15 | 505.11 | 508.18 |
| ATOMITE[a] | 912.62 | 906.17 | 909.45 | | | |
| N-650 Carbon Black[b] | 25.35 | 25.17 | 25.26 | | | |
| Peroxide Crosslinking Agents | | | | | | |
| VAROX 802-40KE[c] | 15.21 | 15.1 | 15.16 | | | |
| TAIC DLC-A[d] | 10.14 | 10.07 | 10.11 | | | |
| Plasticizers | | | | | | |
| SUNPAR 2280[e] | 152.1 | | | 255.57 | | |
| EO19 | | | 151.58 | | | 254.09 |
| ELEVAST C30 polymer modifiers[f] | | 151.03 | | | 252.55 | |
| Other Additives | | | | | | |
| Zinc Oxide 99%[g] | | | | 25.56 | 25.26 | 25.41 |
| N-550 Carbon Black[h] | | | | 408.92 | 404.09 | 406.54 |
| Stearic Acid[i] | | | | 5.11 | 5.05 | 5.08 |
| Sulfur Crosslinking Agents | | | | | | |
| BUTYL ZIMATE (ZDBC)[j] | | | | 10.22 | 10.1 | 10.16 |
| CAPTAX MBT[k] | | | | 5.11 | 5.05 | 5.08 |
| AKROCHEM TMTD[l] | | | | 2.56 | 2.53 | 2.54 |
| Sulfur[m] | | | | 7.67 | 7.58 | 7.62 |
| Total batch [g] | 1622.43 | 1610.97 | 1616.81 | 1231.87 | 1217.32 | 1224.7 |

[a]Calcium carbonate available from IMERYS.
[b]Carbon black available from Columbian Chemicals.
[c]2-2'-Bis(tert-butylperoxy) diisopropyl benzene on clay, available from R.T. Vanderbilt.
[d]Triallyl isocyanurate on silicon dioxide available from Harwick Co..
[e]Paraffinic Petroleum Oil available from R. E. Carroll.
[f]A synthetic oil (polyolefin) available from ExxonMobil.
[g]Zinc oxide available from Sigma-Aldrich.
[h]Carbon black available from Columbian Chemicals.
[i]Stearic acid Available from Sigma-Aldrich.
[j]Zinc dibutyldithiocarbamate available from R. T. Vanderbilt.
[k]2-Mercaptobenzothiazole & white mineral oil, available from R.T. Vanderbilt.
[l]Tetramethylthiuram disulfide available from Akrochem Corporation.
[m]Sulfur available from R. T. Vanderbilt.

Formulations

All polymer formulations in Table 1 were prepared in a Banbury Mixer with a "1.5 liter" volume. The temperature of the water in the heating jacket of the mixing chamber was about 30-40° C. All components, excluding the crosslinking 160° C.; peroxide formulations were cured at 175° C.). Samples (12 mm thickness) for the "compression set" test and samples for the "off-gas" test were cured for a time of "t95 plus 15 minutes." The cure sheets were cut to the dimensions specified in the corresponding ASTM test methods.

TABLE 2

Rheology Properties

| Samples | Comp. Ex. 1A | Comp. Ex. 2A | Ex. 1A | Comp. Ex. 1B | Comp. Ex. 2B | Ex. 1B |
|---|---|---|---|---|---|---|
| ML(1 + 4) @100° C. | 81.3 | 75.9 | 86.6 | 62.3 | 56.2 | 71.6 |
| Mooney Scorch to t10 @ 125° C. [ASTM D1646] | | | | | | |
| Initial Torque | 68.2 | 61.8 | 78.5 | 52.6 | 47.1 | 68.6 |
| t3 (time to get to 3% of the maximum torque) [min] | — | — | — | 9.8 | 8.7 | 7.9 |
| t5 (time to get to 5% of the maximum torque) [min] | — | — | — | 11 | 9.7 | 8.8 |
| t10 (time to get to 10% of the maximum torque) [min] | — | — | — | 13 | 11 | 10 |
| Mm (minimum torque) | 28.5 | 27.1 | 31.5 | 22.3 | 20.5 | 27.7 |
| MH (max torque) | 29.4 | 28.8 | 32.8 | 57.6 | 55.7 | 63.1 |
| | MDR @ 175° C. [ASTM D5289] | | | MDR @ 160° C. [ASTM D5289] | | |
| ML (minimum torque) [dNm] | 1.84 | 1.81 | 2.05 | 1.64 | 1.55 | 1.98 |
| MH (maximum torque)[dNm] | 20.28 | 25.82 | 33.65 | 21.02 | 19.99 | 17.57 |
| dS' (MH − ML) [dNm] | 18.44 | 24.01 | 31.6 | 19.38 | 18.44 | 15.59 |
| t10 (time to get to 10% of the maximum torque) [min] | 0.87 | 0.7 | 0.74 | 1.32 | 1.17 | 1.06 |
| t90 (time to get to 90% of the maximum torque) [min] | 11.57 | 11.15 | 11.14 | 15.1 | 11.53 | 8.56 |

TABLE 3

Mechanical Properties Before and After Aging

| Samples | Comp. Ex. 1A | Comp. Ex. 2A | Ex. 1A | Comp. Ex. 1B | Comp. Ex. 2B | Ex. 1B |
|---|---|---|---|---|---|---|
| 100% Modulus [MPa] | 1.68 | 1.93 | 2.65 | 3.49 | 4.06 | 5.47 |
| Ult Tensile [MPa] | 3.72 | 3.28 | 3.34 | 9.4 | 11.25 | 13.44 |
| Ult Elongation [%] | 481 | 297 | 225 | 285 | 311 | 352 |
| Shore A Hardness | 59 | 64 | 73 | 66 | 78 | 67 |
| Heat aging 70 Hr @ 125° C. [ASTM D573] | | | | | | |
| 100% Modulus [MPa] | 1.888 | 0.067 | | 6.555 | 7.598 | 8.495 |
| Ult Tensile [MPa] | 2.58 | — | 2.76 | 11.5 | 12.78 | 14.93 |
| Ult Elongation [%] | 334 | 116 | 87 | 185 | 140 | 195 |
| Shore A Hardness | 61 | 67 | 76 | 73 | 80 | 74 |
| Heat aging 70 Hr @ 150° C. [ASTM D573] | | | | | | |
| 100% Modulus [MPa] | | | | 9.526 | 5.915 | 10.723 |
| Ult Tensile [MPa] | 1.73 | 1.42 | 1.79 | 10.67 | 11.01 | 12.96 |
| Ult Elongation [%] | 24 | 4 | 7 | 118 | 99 | 122 |
| Shore A hardness | 68 | 71 | 80 | 77 | 77 | 83 |

TABLE 4

Additional Properties

| Samples | Comp. Ex. 1A | Comp. Ex. 2A | Ex. 1A | Comp. Ex. 1B | Comp. Ex. 2B | Ex. 1B |
|---|---|---|---|---|---|---|
| C-Tear Strength [MPa] | 14.5 | 10.3 | 11 | 28.6 | 29.1 | 35.7 |
| Compression Set (CS), [CM/CS-Buttons/t95 + 15 min/160° C.] | | | | | | |
| CS [22 hr, −25° C.] | 52 | 37 | 71 | 45 | 36 | 80 |
| CS [22 hr, 100° C.] | 17 | 15 | 18 | 23 | 22 | 25 |
| CS [22 hr, 125° C.] | 18 | 19 | 20 | 46 | 44 | 46 |
| Temperature Retraction (TR) | | | | | | |
| TR 10 (° C.) | −39.9 | −43.3 | −39 | −40.95 | −44.2 | −37 |
| TR 30 (° C.) | −37.3 | −39.3 | −35.6 | −36.6 | −37.8 | −30.6 |
| TR 50 (° C.) | −32.9 | −37.3 | −29.6 | −34.8 | −36.2 | −22.9 |
| TR 70 (° C.) | −28.05 | −33.2 | −20.1 | −31.8 | −34.2 | −14.2 |
| TR70 − TR10 (° C.) | 11.91 | 10.06 | 18.9 | 9.09 | 10.09 | 22.73 |
| % Elongation | 150 | 150 | 150 | 150 | 150 | 150 |
| Off Gas (ppm) | 145 | 85 | 67 | 106 | 74 | 61 |

The inventive compositions were cured with both peroxide and sulfur cure packages. Comparative compositions, with equal weight percents of SUNPAR 2280 or ELEVAST C30, were also cured using the same level of crosslinking agents (see Table 1).

The melt viscosities (ML(1+4)@100° C. from MDR) of all peroxide formulations, Comparative Examples 1A, 2A, and Inventive Example 1A, were similar. Inventive Example 1A displayed both the favorable mixing characteristics (Mooney Viscosity), typical of a composition containing an oil (see Comparative Examples 1A and 2A), good mechanical properties, and comparable mechanical properties after aging. In addition, the inventive example had a lower amount off-gas as compared to the comparative examples.

Likewise the melt viscosities (ML from MDR) of all sulfur cured formulations, Comparative Examples 1B, 2B, and Inventive Example 1B, were similar. When these compounds were cured, significant advantages were noted for Inventive Example 1B. The time needed to cure the formulation was significantly reduced, relative to Comparative Examples 1B and 2B (see MDR properties). Inventive Example 1B also had good mechanical properties, and comparable mechanical properties after aging. In addition, the inventive example had a lower amount of off-gas as compared to the comparative examples.

Although the invention has been described in considerable detail in the preceding examples, this detail is for the purpose of illustration, and is not to be construed as a limitation on the invention, as described in the following claims.

The invention claimed is:

1. A crosslinked composition formed by thermally treating a composition comprising at least the following three components:
   A) an ethylene-based polymer that has a density less than, or equal to, 0.910 g/cc, and is selected from the following:
      i) an ethylene/propylene/diene interpolymer with a Mooney viscosity, ML(1+4) at 125° C., greater than 10, or
      ii) an ethylene/α-olefin copolymer with a melt index, I2, less than, or equal to, 10 g/10 min;
   B) an olefin-based polymer that has a melt viscosity less than, or equal to, 20,000 cP, at 350° F.; and
   C) a crosslinking agent, and
   wherein the composition has an ultimate tensile strength greater than 12 MPa, an ultimate elongation greater than 100 percent, and a Shore A hardness greater than 60; and
   wherein the olefin-based polymer of Component B has a melting temperature (Tm) less than 100° C., as determined by DSC.

2. The crosslinked composition of claim 1, wherein Component A is present in an amount from 50 to 98 weight percent, and Component B is present in an amount from 2 to 50 weight percent, and wherein the weight percentages of Components A and B are each based on the sum weight of Components A and B.

3. The crosslinked composition of claim 1, wherein the ethylene-based polymer of Component A is an ethylene/propylene/diene interpolymer.

4. The crosslinked composition of claim 1, wherein the olefin-based polymer of Component B has a melting temperature (Tm) greater than 40° C., as determined by DSC.

5. The crosslinked composition of claim 1, wherein Component B is present in an amount from 2 to 40 weight percent, based on the sum weight of Components A and B.

6. The crosslinked composition of claim 1, wherein the olefin-based polymer of Component B has a molecular weight distribution (Mw/Mn) from 1.2 to 3.

7. The crosslinked composition of claim 1, wherein the olefin-based polymer of Component B is an ethylene-based polymer.

8. The crosslinked composition of claim 7, wherein the ethylene-based polymer of Component B is a homogeneously branched linear ethylene/α-olefin interpolymer, or a homogeneously branched substantially linear ethylene/α-olefin interpolymer.

9. The crosslinked composition of claim 1, wherein the ethylene-based polymer of Component A has a Mooney Viscosity (ML 1+4) at 125° C. from 10 to 200.

10. The crosslinked composition of claim 1, wherein the composition does not contain a tackifier.

11. The crosslinked composition of claim 1, wherein the composition does not contain a propylene-based polymer.

12. An article comprising at least one component comprising the crosslinked composition of claim 1.

13. The crosslinked composition of claim 1, wherein the ethylene-based polymer of component A is an ethylene/propylene/diene interpolymer with a Mooney viscosity, ML(1+4) at 125° C., greater than 10.

14. The crosslinked composition of claim 1, wherein the olefin-based polymer of component B is selected from an ethylene/α-olefin copolymer or an ethylene/α-olefin multi-block copolymer.

15. The article of claim 12, wherein the article is selected from an automotive part, a computer part, a building material, a household appliance, a toy, or a footwear component.

16. A crosslinked composition formed by thermally treating a composition comprising at least the following three components:
   A) an ethylene-based polymer that has a density less than, or equal to, 0.910 g/cc, and is selected from the following:
      i) an ethylene/propylene/diene interpolymer with a Mooney viscosity, ML(1+4) at 125° C., greater than 10, or
      ii) an ethylene/α-olefin copolymer with a melt index, I2, less than, or equal to, 10 g/10 min;
   B) an olefin-based polymer that has a melt viscosity less than, or equal to, 20,000 cP, at 350° F.; and
   C) a crosslinking agent, and
   wherein the composition has an ultimate tensile strength greater than 12 MPa, an ultimate elongation greater than 100 percent, and a Shore A hardness greater than 60; and
   wherein the olefin-based polymer of Component B has a molecular weight distribution (Mw/Mn) from 1.2 to 3.

17. An article comprising at least one component comprising the crosslinked composition of claim 16.

* * * * *